(12) United States Patent
Bahrami Eynolghasi

(10) Patent No.: US 11,124,953 B2
(45) Date of Patent: Sep. 21, 2021

(54) ANTI-LEAK SYSTEM FOR SANITARY APPLIANCES

(71) Applicant: Saeid Bahrami Eynolghasi, Karaj (AL)

(72) Inventor: Saeid Bahrami Eynolghasi, Karaj (AL)

(*) Notice: Subject to any disclaimer, the term of this patent is extended or adjusted under 35 U.S.C. 154(b) by 85 days.

(21) Appl. No.: 15/855,409

(22) Filed: Dec. 27, 2017

(65) Prior Publication Data

US 2018/0119400 A1  May 3, 2018

(51) Int. Cl.
*E03C 1/288* (2006.01)
*F16K 15/16* (2006.01)
*E03F 5/04* (2006.01)

(52) U.S. Cl.
CPC ............ *E03C 1/288* (2013.01); *E03F 5/0409* (2013.01); *F16K 15/16* (2013.01)

(58) Field of Classification Search
CPC ......... E03C 1/288; E03C 1/298; E03F 5/0409
See application file for complete search history.

(56) References Cited

U.S. PATENT DOCUMENTS

| | | | |
|---|---|---|---|
| 2005/0188452 A1* | 9/2005 | Hatfield | E03C 1/298 4/252.1 |
| 2014/0373931 A1* | 12/2014 | Huber | E03F 5/042 137/15.08 |
| 2016/0201309 A1* | 7/2016 | Kosarnig | E03C 1/298 137/854 |

* cited by examiner

*Primary Examiner* — P. Macade Nichols
(74) *Attorney, Agent, or Firm* — Azadeh Saidi

(57) ABSTRACT

A leakage prevention system for sanitary appliances, such as shower drains, kitchen drains, any other building drains, and squat toilets. This system can completely prevent leaks from any wastewater or sewage drains, wherein there is no need to attach the edges of a waterproof membrane to the surface beneath the waterproof membrane.

12 Claims, 25 Drawing Sheets

ANTI-LEAK SYSTEM FOR SANITARY APPLIANCES

BACKGROUND OF INVENTION

Leakage is one of the biggest problems in any sanitary appliance, such as shower drains, kitchen drains, any other building drains, and especially squat toilets, which exists in the wet areas that require waterproof membranes. Leaks affect the welfare of the residents and the employees in an apartment and the office buildings, especially when the leak occurs on an upper floor. The cause of these leaks usually arises during construction of the building, when a waterproof membrane is installed in order to prevent the moisture leaking through the floor's cracks. However, the main problem arises when the water collected on the waterproof membrane needs to be discharged; otherwise the bacteria grow in the collected water and cause health issues and damage to the underneath floor.

To discharge the water, the edges of the waterproof membrane are placed in the sewer path and attached to the surface underneath by using primers. If primers are not used to attach the edges of the waterproof membrane, water and sewage can seep under the membrane, due to blockage in the pipe or a large discharge of water, leading to leaks in lower areas. However, leaks are still possible if there is dirt between the membrane and the surface underneath, if deterioration of the primers occurs over time, or if there is any movement that detaches the primers from the surfaces. Generally a good quality sanitary silicone sealant containing mold inhibitors may last 5 years. When the sealant ages it loses its elasticity becoming hard and brittle, which will cause it to become detached from the surface and allow water to escape through the cracks under the waterproof membrane.

This invention completely prevents leaks from sanitary appliances indefinitely. Because there is no use of primers, the problems discussed above are solved. In addition, installation of this invention is very simple.

SUMMARY OF THE INVENTION

This invention prevents leaks from sanitary appliances, such as shower drains, kitchen drains, any other building drains, and squat toilets. This system can completely prevent leaks from any wastewater or sewage drains. In conventional sewer systems for sanitary appliances, the edges of the waterproof membrane "16" are placed in the sewer path, as shown in FIGS. 1 to 4. To prevent water from going back under the waterproof membrane, resulting in leakage to the space underneath, the edges of the waterproof membrane "16" located inside the sewer path are attached to the surface beneath the waterproof membrane.

Conventionally, the best way to attach these waterproof membranes is by using silicon sealant primers. However, these primers can deteriorate and become detached from the surfaces, leading to water permeating under the waterproof membrane. The other downside of using primers is that completely clean surfaces are required when applying the sealant. During construction, debris existing around the waterproof membrane is inevitable. Therefore, there is always the possibility of leakage due to incomplete attachment of the edges of the waterproof membrane. This problem is compounded with primer deterioration over time, which leads to further leakage.

In this invention, there is no need to attach the edges of the waterproof membrane to the surface underneath, so the problems faced when using primers are eliminated. Along with ease of installation, there are many other advantages of this invention. For example, making repairs to an existing drain can be done without damaging the building. And ensuring the correct installation of the device without the need of a skilled technician is possible, without any worry of leaks forming in the future.

This invention is the solution to leakage issues of wastewater and sewage from sanitary appliances. Leaks in these areas most often occur when water or sewage penetrates under the waterproof membrane due to detachment from the underlying surface. To prevent water or sewage from leaking under the waterproof membrane, a primer is usually used to attach the edges of the membrane to the surface underneath (as shown in FIG. 5). The best primer in this case is silicon sealant "18". But applying a primer creates different problems, such as deterioration over time, resulting in cracks on the surfaces leading to water seeping beneath the waterproof membrane. Besides the problem of leaks, application of the primer is difficult and must be performed with high accuracy to ensure complete attachment of the surfaces. If the surfaces are not thoroughly cleaned before the silicon sealant "18" is applied, they cannot be properly attached to one another.

Since there is no use of primers in this invention, there are no problems involved in installing the material and one can be certain that leaks will not form over time. The installation and application of this invention is very simple, with no need for specific skills, cleaning the installation spot or periodic maintenance. Also, when repairs are required on the sanitary appliances, repairing or replacing parts of this invention is simple. Unlike in conventional systems, it is not necessary to destroy the floor (or the ceiling of the level below) to fix any problems.

DETAILED DESCRIPTION OF THE SPECIFICATIONS

This invention prevents leaks from sanitary appliances, such as shower drains, kitchen drains, any other building drains, and squat toilets. This system can completely prevent leaks from any wastewater or sewage drains. In conventional sewer systems for sanitary appliances, the edges of the waterproof membrane "16" are placed in the sewer path, as shown in FIGS. 1 to 4. To prevent water from going back under the waterproof membrane, resulting in leakage to the space underneath, the edges of the waterproof membrane "16" located inside the sewer path are attached to the surface beneath the waterproof membrane.

Conventionally, the best way to attach these waterproof membranes is using silicon sealant primers. However, these primers can deteriorate and become detached from the surfaces, leading to water permeating under the waterproof membrane. The other downside of using primers is that completely clean surfaces are required when applying the sealant. During construction, debris existing around the waterproof membrane is inevitable. Therefore, there is always the possibility of leakage due to incomplete attachment of the edges of the waterproof membrane. This problem is compounded with primer deterioration over time, which leads to further leakage.

In this invention, there is no need to attach the edges of the waterproof membrane to the surface underneath, so the problems faced when using primers are eliminated. Along with ease of installation, there are many other advantages of this invention. For example, making repairs to an existing drain can be done without damaging the building. And ensuring the correct installation of the device without the need of a skilled technician is possible, without any worry of leaks forming in the future.

Because it is necessary to drain water from the surface of the floor on which the sanitary appliance is located, waterproof membrane "16" is used under the surface of the floor.

In sanitary appliances such as shower drains, kitchen drains, any other building drains, and squat toilets, the edges of the waterproof membrane "16" are placed inside the sewer inlet (FIGS. 1 to 4). In this way, leaked water will be guided towards the sewer "19" (FIG. 5) of the building. However, in toilets (excluding the squat toilets) the edges of the waterproof membrane "16" are not placed inside the sewer inlet. Therefore water gathered on the floor will be on the surface of waterproof membrane "16" and cannot be discharged to the sewer, so it is necessary to collect water from the floor with an absorbent object (e.g. absorbent sweeper). By using this invention in the outlet of the toilet, accumulated water can be discharged to the sewer, along with long-term prevention of leaks.

Figure 9:
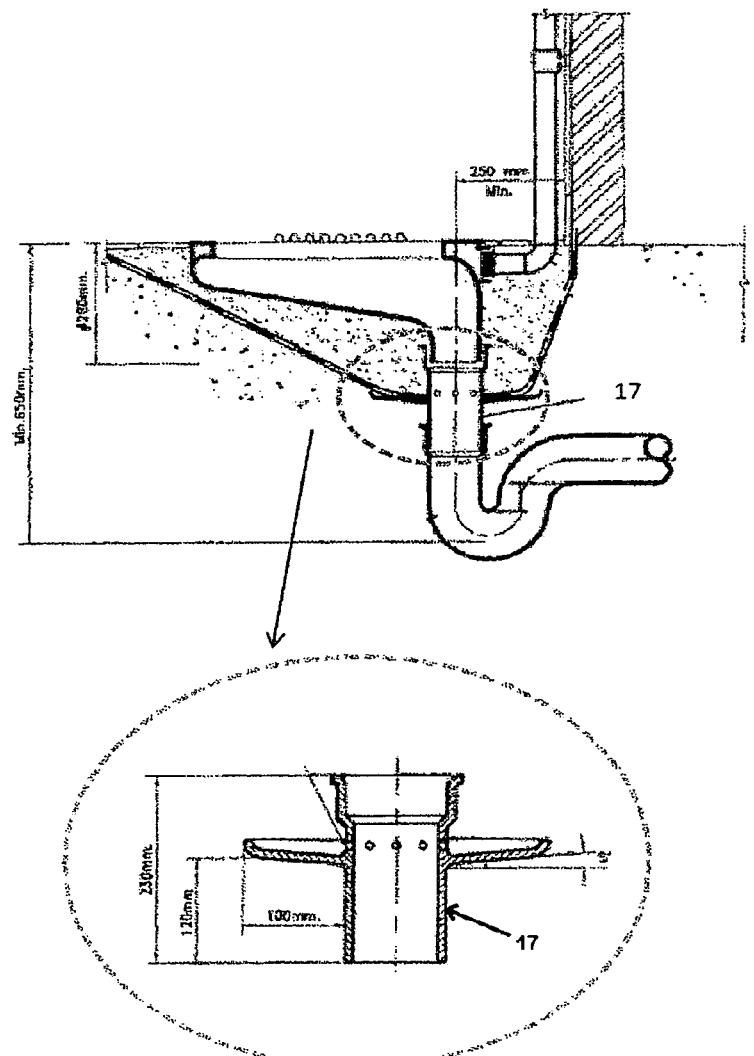

In the outlet from the sanitary appliance towards the inlet of the building sewer "21" (FIG. 4), there is a seam "20" (FIG. 4) to guide the water from the surface of the waterproof membrane "16" toward the sewer. If this leaked water from the floor surface accumulates on the waterproof membrane "16" surface and doesn't drain, it can cause damage to the building, as well as health concerns for residents. In some cases, a cast iron piece "17" is placed in the path of the waterproof membrane "16" towards the building sewer (as shown in FIG. 9) and is used to discharge water from the surface of the waterproof membrane to the sewer. All of the connections to this device (cast iron piece "17") are fully sealed and water can be discharged from the embedded holes in the cast iron piece "17" (FIG. 9).

In both cases, whether having the seam "20" in the connections (FIG. 4) or using the cast iron piece "17", water can sometimes leak under the waterproof membrane "16", through the edges of the membrane, and then permeate downwards into lower areas of the building.

Figure 5:
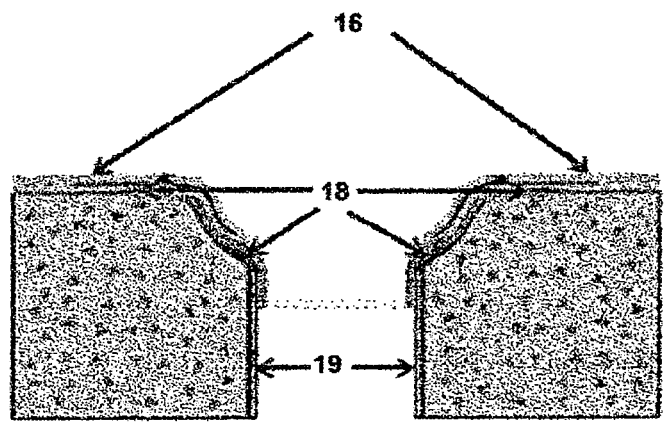
FIG. 5 displays a applying silicon to attach the water proof membrane to its lower surfaces to prevent leakage FIG. 6 displays the function of duckbill valve FIG. 7 displays the duckbill valve FIG. 8 displays the umbrella valve FIG. 9 displays a detailed view of squat toilet installation using cast iron piece"17"

To prevent this problem, the edges of the waterproof membrane "16" that enter into the inlet of the building sewer (FIG. 5), or the edges of the waterproof membrane "16" that are placed on the cast iron piece "17" (FIG. 9) if the cast iron piece "17" is being used, are attached to the lower surface piece "17" by primers or some other material according to FIG. 5 (the best material in this case is silicon sealant primer "18").

But these primers have their own problems and will deteriorate over time and also cause cracking of the attached surfaces. In addition, before the silicone sealant is applied, the surfaces must be thoroughly cleaned, or the sealant can become detached. Also a skillful applicant is needed to apply the sealant for optimal results.

Figure 1:
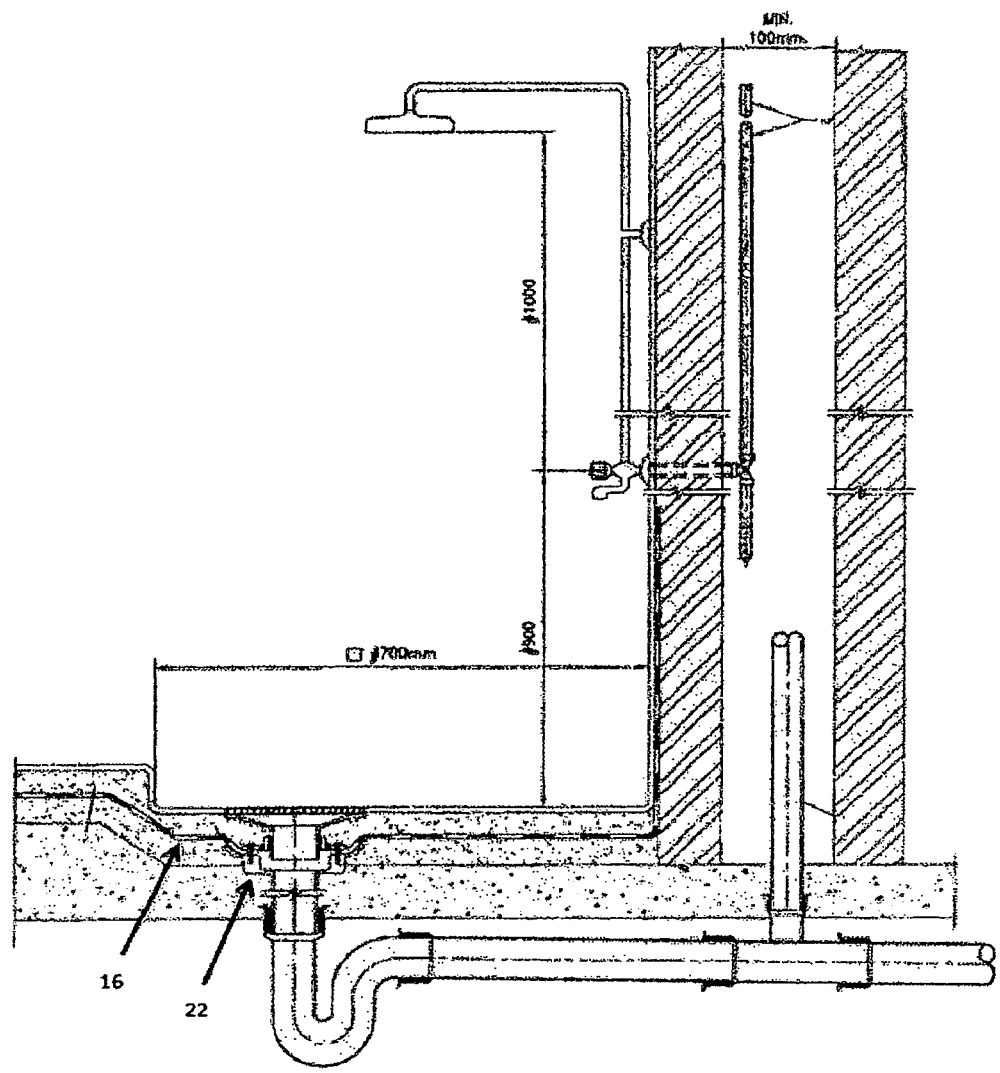
FIG. 1 displays a detailed view of Shower pan installation
Figure 2:
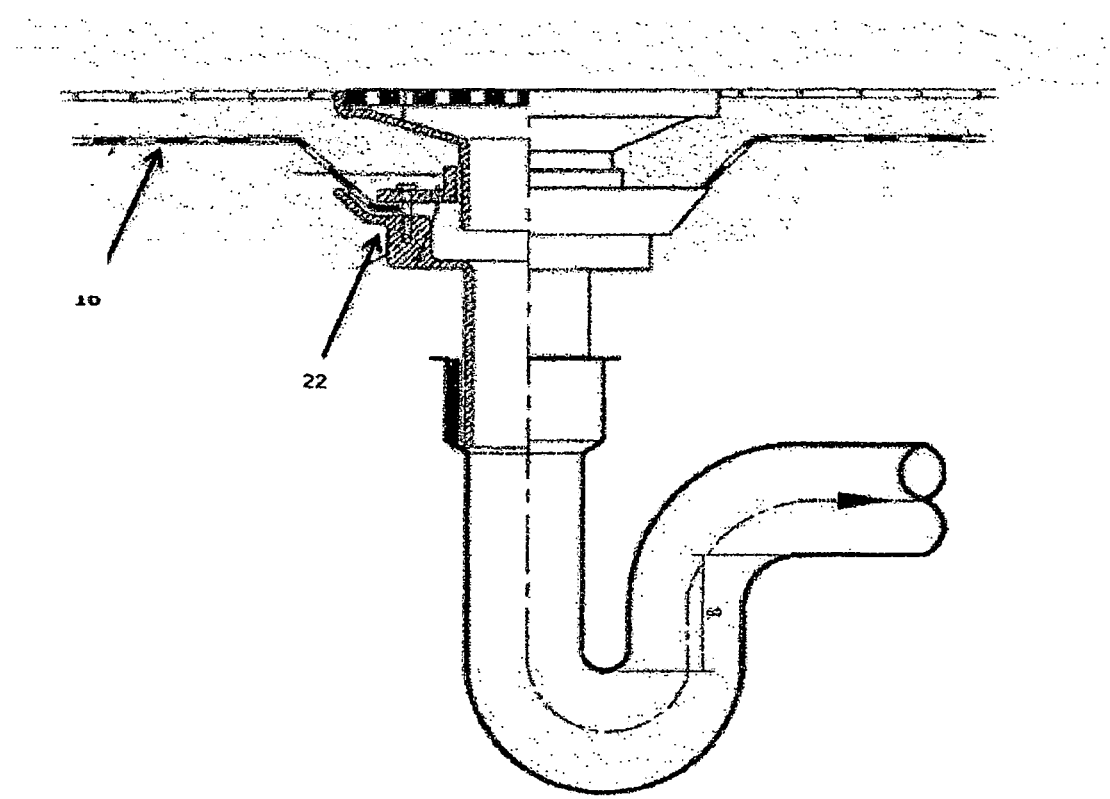
FIG. 2 displays a detailed view of drain installation
Figure 3:
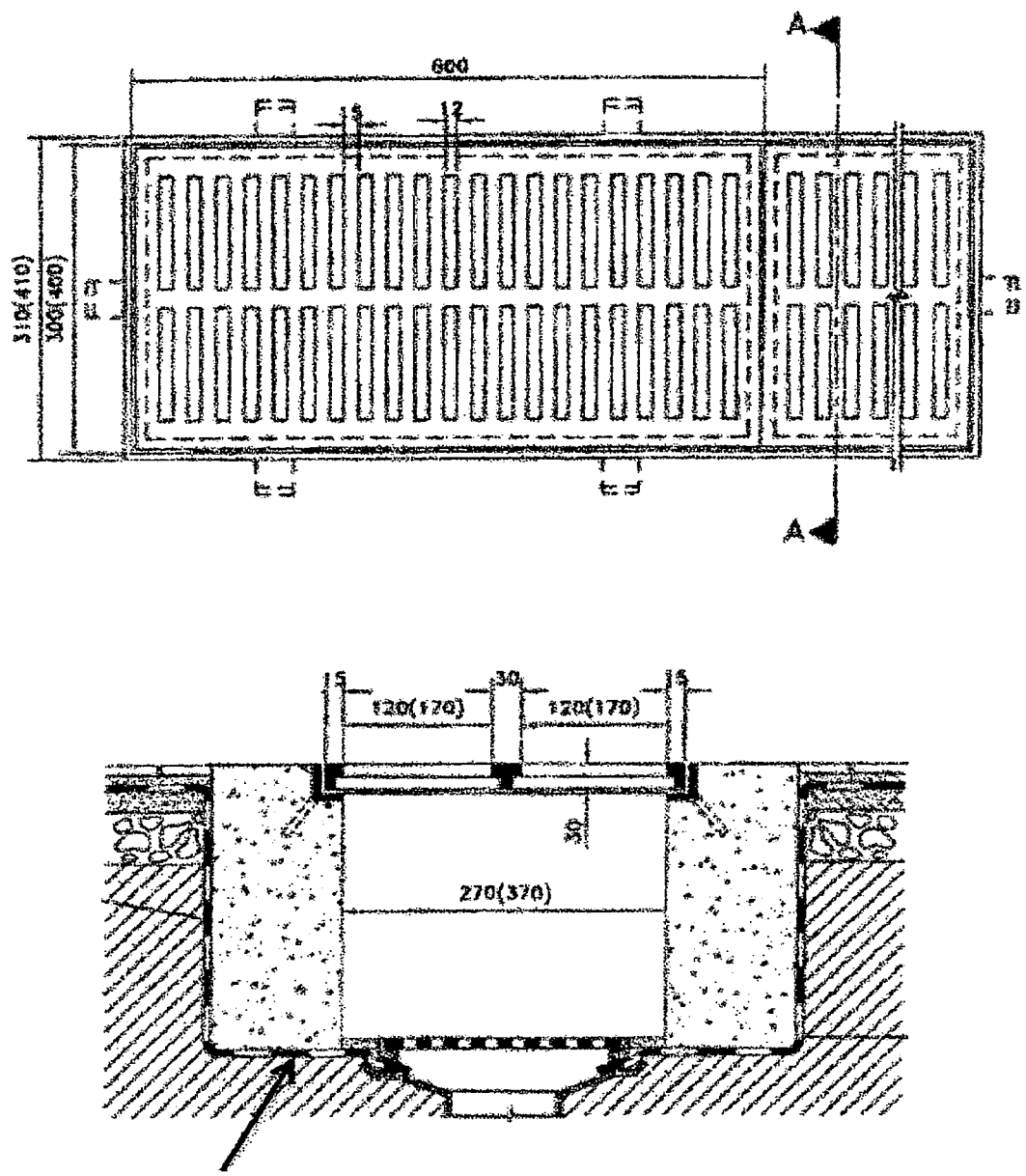
FIG. 3 displays a detailed view of canal drain installation
Figure 4:
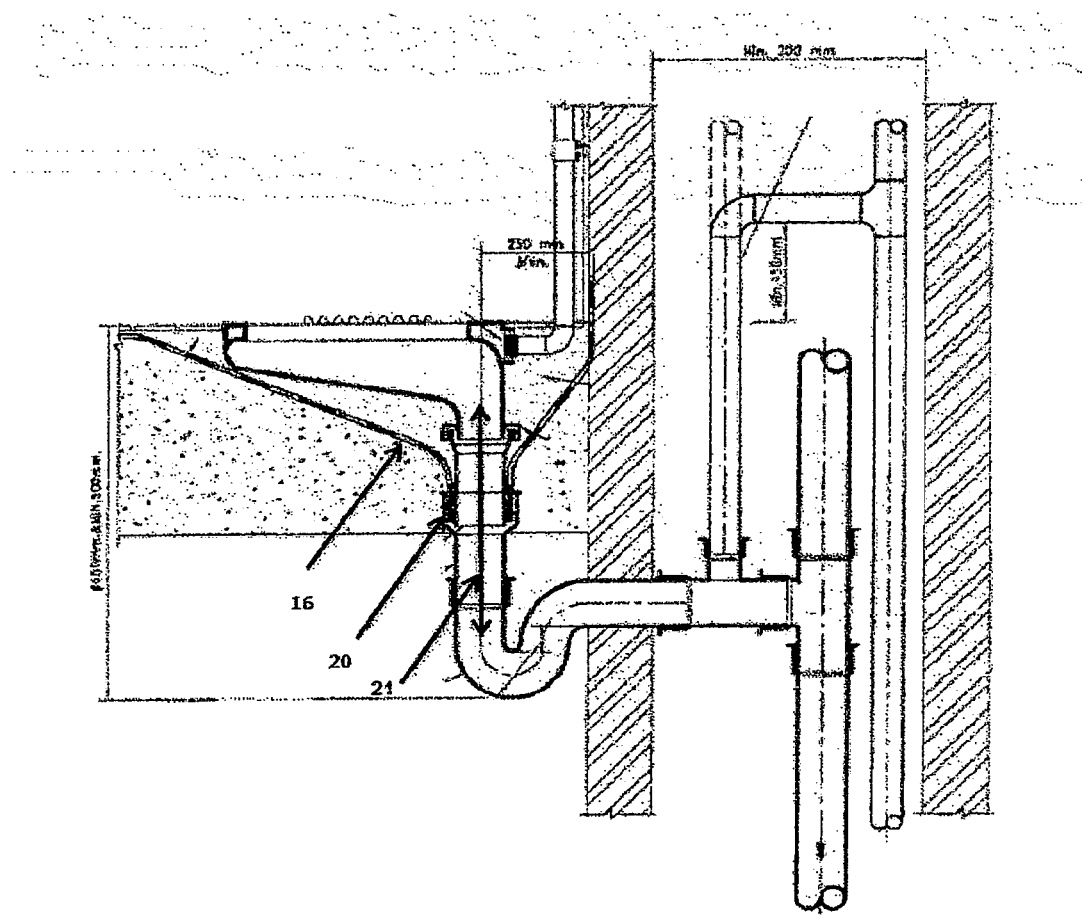
FIG. 4 displays a detailed view of squat toilet installation

In the drain shown in FIG. 2 and the shower drain in FIG. 1, the waterproof membrane "16" edges are placed between two metal pieces that are screwed together. In this situation there is no need to apply primers. However, there would be two cases with this design:

1) In the first case, if there would be a seam in the area near the screws for discharging accumulated water from the surface of the waterproof membrane "16", then the problem of leaking water through the waterproof membrane and reaching to the underneath floor still remains.

2) In the second case, if a tight joint could be achieved via screwing the two metal plates around the membrane, then there is no way to remove the water from the membrane surface. One important point in these two figures (FIG. 1 and FIG. 2) and other similar cases; is that when the sewer is blocked, residents are unaware of this problem until the water comes to the top surface of the drain inlet. At this time water will cover both the entire membrane and the floor. Water collected on the floor can cause problems for the occupants as well as damage to the structure. But by using this invention, the water level can be raised just in the drain so that wastewater doesn't cover the whole surface of the floor, even when the sewer is blocked. Also, by identifying the blockage when it occurs, we can disconnect the water flow and prevent the accumulation of the water on the surface. In the absence of this invention, it is impossible to be aware of problems until after wastewater or sewage has leaked out and covered the floor.

This invention is a device that discharges water from the waterproof membrane "16" surface to the sewer through a separated conduit, in a way that there is no need to have a seam in the joints from the sanitary appliance outlet to sewer inlet. All joints and connections in this invention are completely sealed. Also, in this invention there is no need to use any primers and there is no probability of leakage under the waterproof membrane "16". The abovementioned problems associated with drains (as shown in FIG. 1 and FIG. 2) will also be solved.

This invention is installed between the outlet of the sanitary appliance (or drain of any other wet area) and the inlet to the sewer. This invention can be used to prevent leaks wherever a waterproof membrane beneath the floor leads to a building sewer "19" (FIG. 5).

This invention has two conduits: the major conduit "1" and the minor conduit "8". The major conduit "1" collects the main wastewater and is sealed to an outlet of any sanitary appliance (or drain outlet of any other wet area) through side "2". It is sealed to the building sewer "19" through side "3" by using a sealing gasket, or any other suitable way to achieve permanent attachment.

There is a sloped surface "10" around the major conduit "1", which makes an angle with horizontal, called "a", where "a" can be any angle (for example, 5 degrees). The edge of the waterproof membrane "16" is placed on the sloped surface "10", covering it completely. Through this the water from the floor surface passes through hole "7" and then to the minor conduit "8". The minor conduit "8" is surrounded by a shield "5". This shield "5" protects parts "8", "9", "4" and "7" toward contacting with the construction and makes them accessible through the ceiling of the floor below (in non-ground floors). Therefore in the case of fixing or replacing, there is no need to destroy the floor of the upper level or the ceiling of the level below. In ground floors, these parts will be placed in the foundation of the building.

Figure 6:
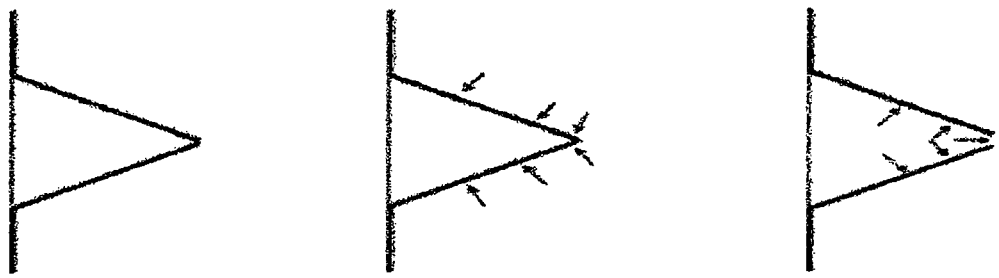
Figure 7:
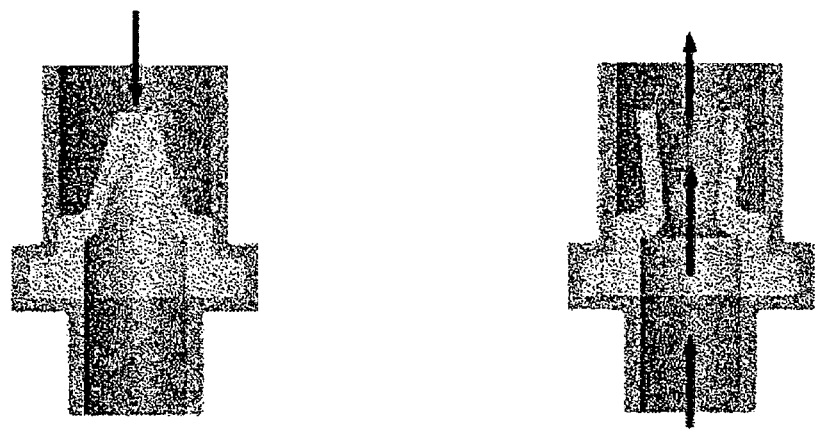
Figure 8:
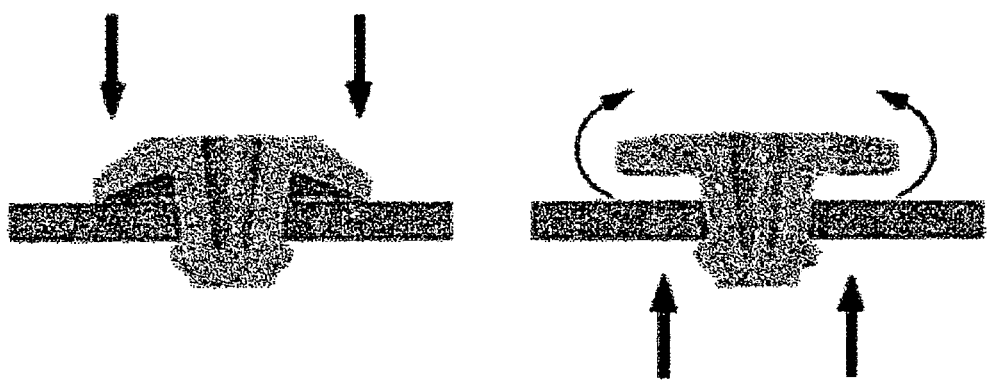

The minor conduit "8" is connected to check valve "9". This check valve prevents water from going back from side "3" to "10" or to under the waterproof membrane. It is recommended that for check valve "9" a "Duckbill valve" or "umbrella valve" be used (the Duckbill valve and its function is shown in FIG. 6 and FIG. 7 and the umbrella valve is shown in FIG. 8), because their proper functioning is independent of their installation direction (horizontal or vertical). They also have corrosion and water resistance, which are useful properties for objects in the location of "9". Any other types of check valves that are suitable for this purpose can also be used for "9".

Pipe "8" is connected to "9" and then to "1" through hole "4". The water collected on the floor surface passes through hole "7" and the minor conduit "8" and finally discharges to side "3" of the major conduit "1" through hole "4".

Whenever the building sewer pipe is blocked or when large volumes of water are discharged to the sanitary appliances, the check valve "9" prevents water in the major conduit from returning to "10" where the waterproof membrane "16" edges are located. Therefore, no water can permeate under the waterproof membrane and there will be no leaks to the area below. As a result, the problem of water leaking beneath sanitary appliances will be solved completely.

This invention can be used to prevent leaking from wherever the waterproof membrane is placed in the building sewer. To install this invention, the outlet of the sanitary appliance (or the drain of any other wet area) is inserted into side "2" and then sealed. Side "3" of this invention is connected to the building sewer "19", and this connection is also seamless.

During the installation of the present invention, the waterproof membrane underneath the floor should place at the same level with surface "A". The edges of the membrane "16" lie on part "10" such that the edges of the membrane do not enter into the horizontal section of "12". Water flows from the surface of the waterproof membrane "16" to "10", followed by "12", and then to the curved part of "11". On the surface of "11" there is a wire mesh that covers the whole surface of "11" and then this wire mesh is covered by plastic fibers (or any other material that prevents contact with materials used in the construction of the building, such as cement, soil, sand, etc.).

Finally a larger wire mesh is placed on "12" in order to cover the whole surface of "11" and "12", and the edges of this mesh extend some distance through "10" and under the waterproof membrane "16" (for example, up to one third of the width of "10"). In this way, after installing the invention in the desired place and burying with concrete or other materials, these materials cannot enter hole "7" and check valve "9". It is clear that by this preparation, the construction materials (e.g. cement, soil, sand, etc. located under the squat toilet bowl, according to FIG. 4), will not enter the sewer and do not cause damage to the squat toilet or any other sanitary appliance.

However, in the case of the cast iron piece "17" which is placed in the path from the waterproof membrane "16" to the sewer (according to FIG. 9), there is a possibility for excretion of sand and other materials through the pores of the cast iron piece, which may cause subsequent problems. Regardless of the floor thickness in multi-story buildings, part "6" is extended into the lower level's ceiling. In this case, there will be an open space that is free from any construction materials, where parts "8", "9", "4" and "7" can be located.

Figure 26:
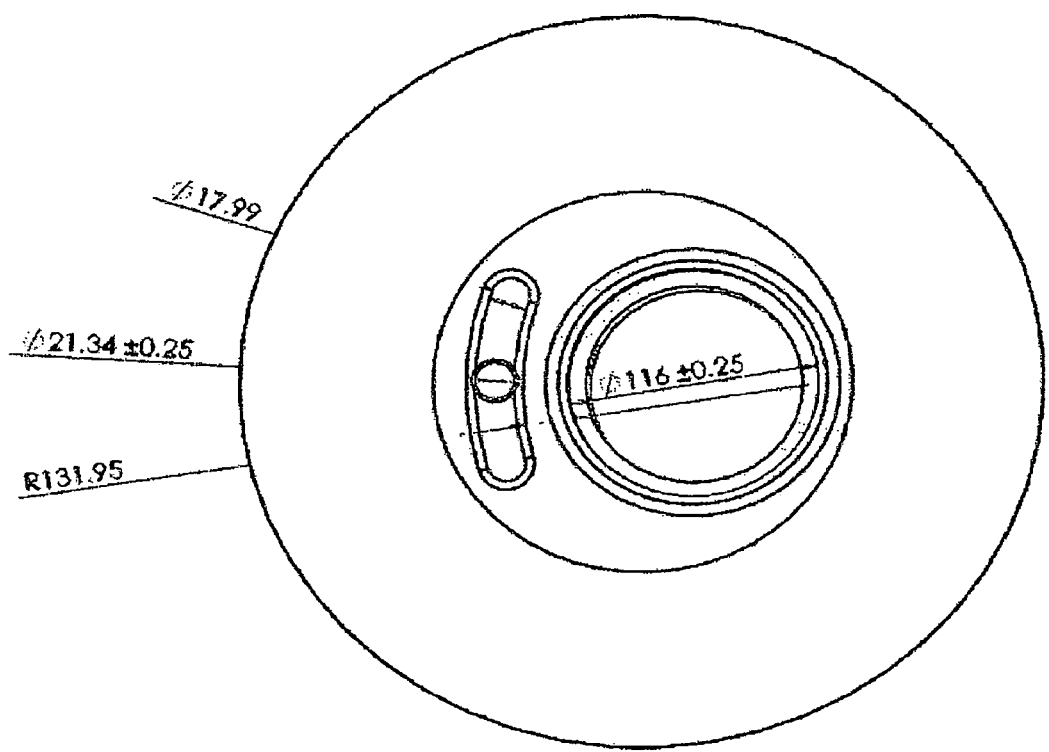
FIG. 26 displays a top view of the invention with suggested dimensions for each component in millimeter FIG. 27 displays a down view of the invention with suggested dimensions for each component in millimeter FIG. 28 displays a side view of the invention with suggested dimensions for each component in millimeter
Figure 27:
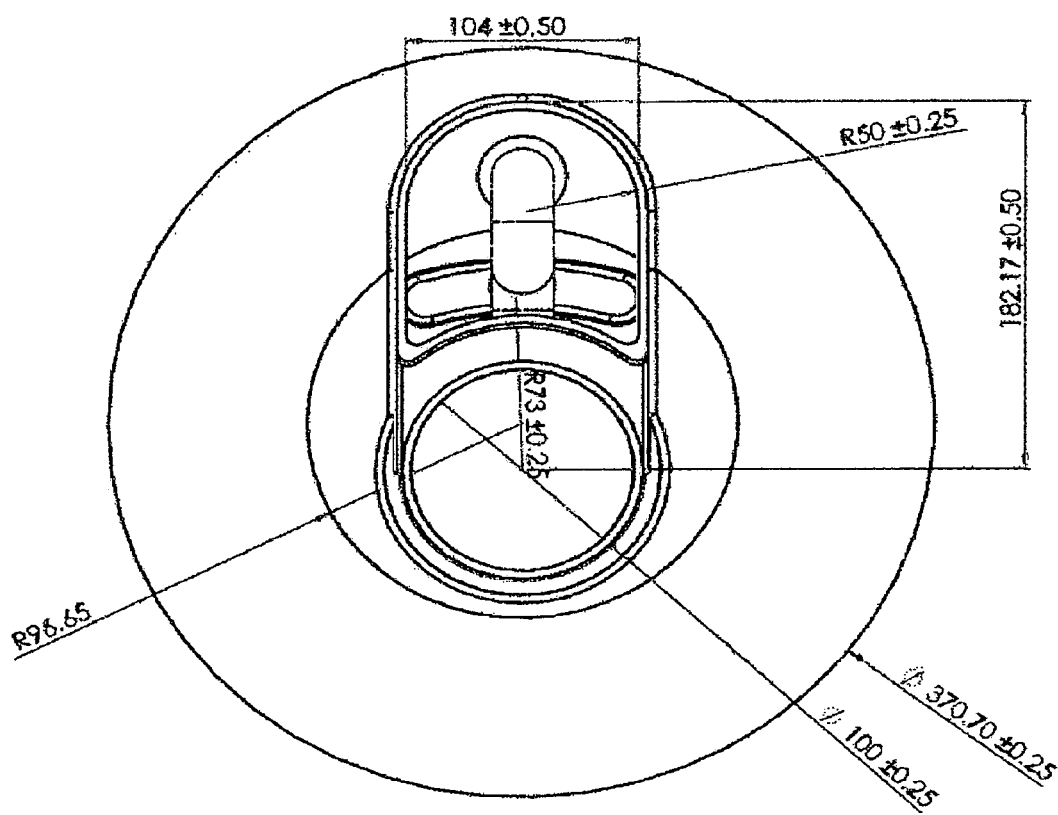
Figure 28:
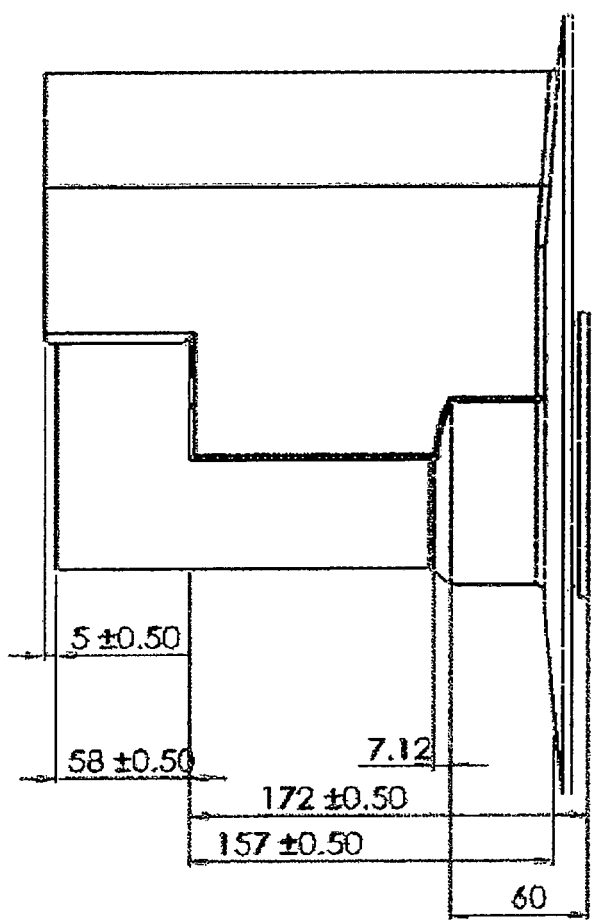

Inside the space mentioned above, "9" should be installed in the lowest part in order to be easily accessible for repairs or replacement of parts "8" and "9", so there is no need to damage the floor when installing these parts. The length of number "6" can be different due to different thicknesses of the floors in multi-story buildings. In FIG. 28, the size of this part is for squat toilet bowls in multi-story buildings with a common floor thickness, in millimeters. FIGS. 26 to 28 show the size of different parts of this invention.

This invention can be made from PVC, cast iron, or any other materials that are suitable for installing in the location of this invention. It is recommended to use a flexible material for pipe "8" in order to easily assemble and separate pipe "8" and check valve "9", and to also connect and disconnect "4" and "7" to "8". Because a tight connection between pipe "8" and "4", "7", and "9" is required, a fastener or any other suitable method can be used to make these connections easy for separation and reconnection.

Check valve "9" is located in a box (refer to index figures) that is connected to pipe "8" from both sides, and can be replaced, repaired, separated, or cleaned if necessary. Holes "4" and "7" must be wide enough to allow the amount of water discharged from the waterproof membrane "16" surface to pass through. For this purpose, the recommended size for the diameter of "8", which is similar to the diameter of holes "7" and "4", is shown in FIG. 26, in millimeters. Any other size can also be used, dependent upon the application.

Figure 20:
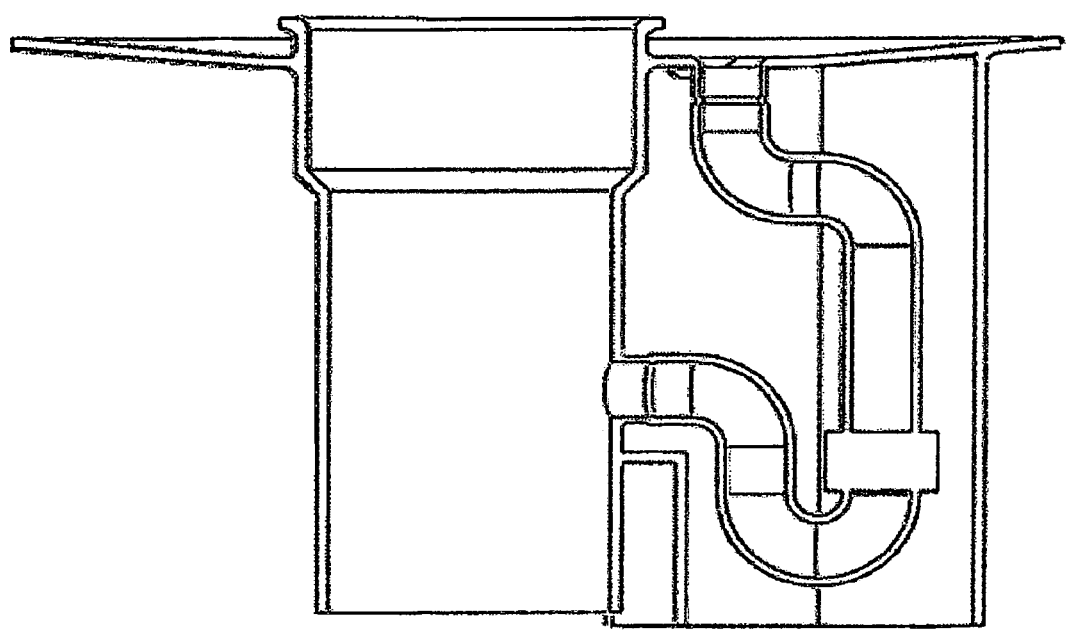
FIG. 20 displays a side and section view of the invention (without number 15)
Figure 21:
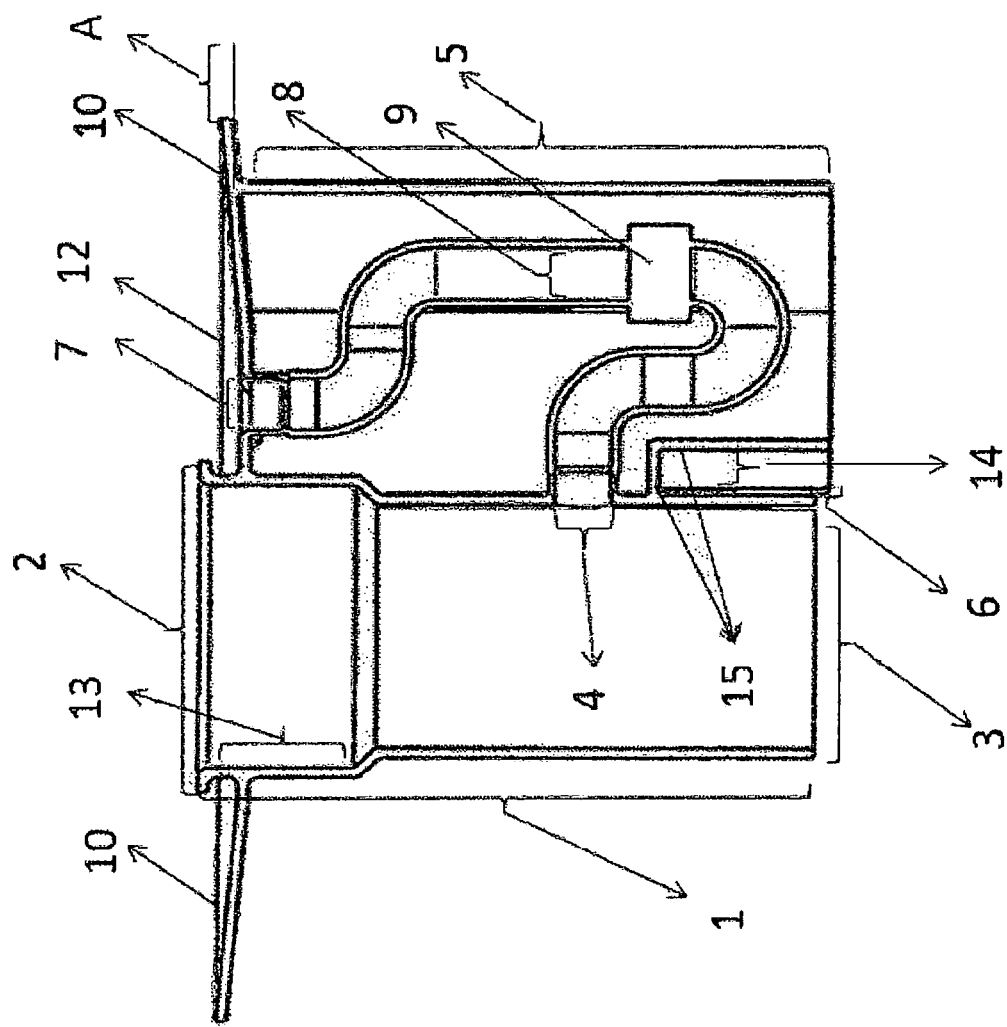
FIG. 21 displays a side and section view of the invention (with number 15)
Figure 22:
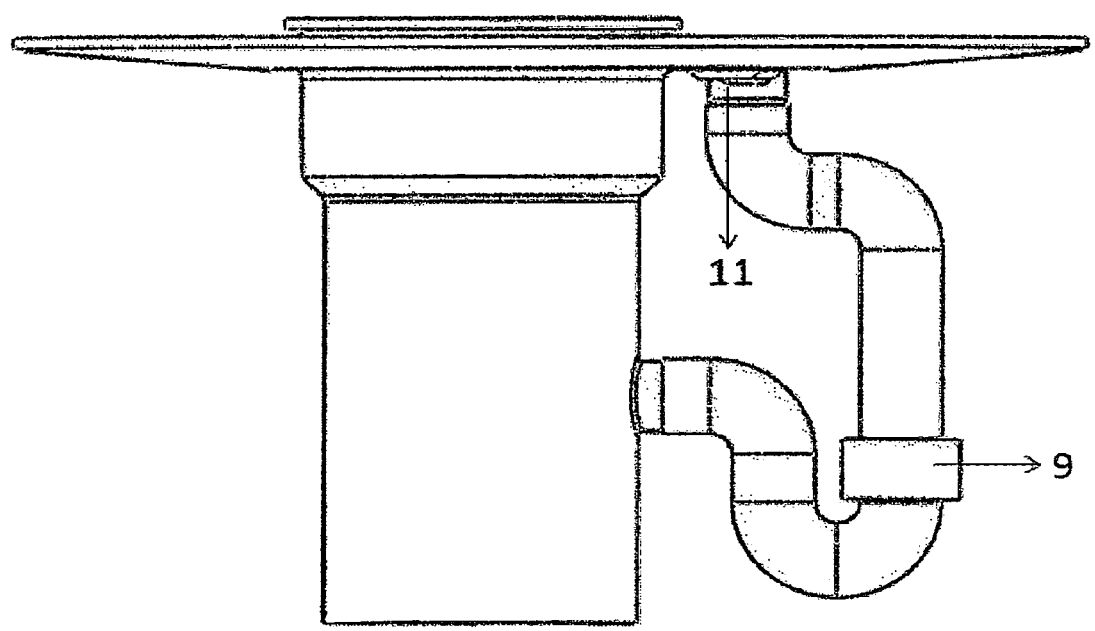
FIG. 22 displays a side view without drawing number 5
Figure 23:
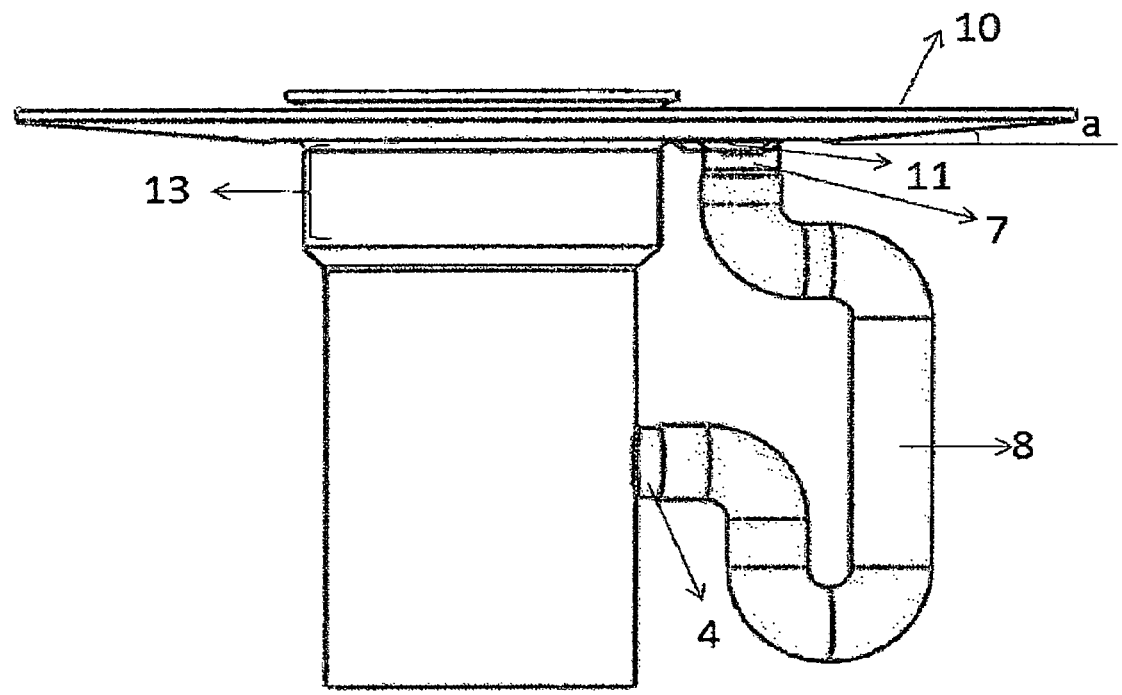
FIG. 23 displays a side view without drawing number 5 and 9
Figure 24:
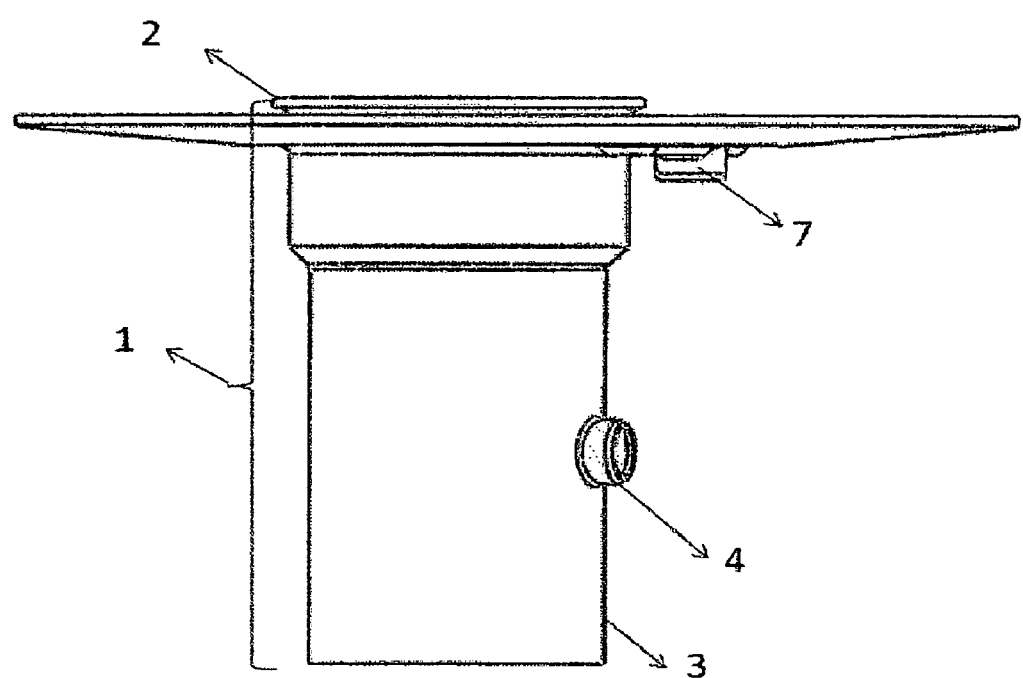
FIG. 24 displays a side view without drawing number 5, 9 and 8
Figure 25:
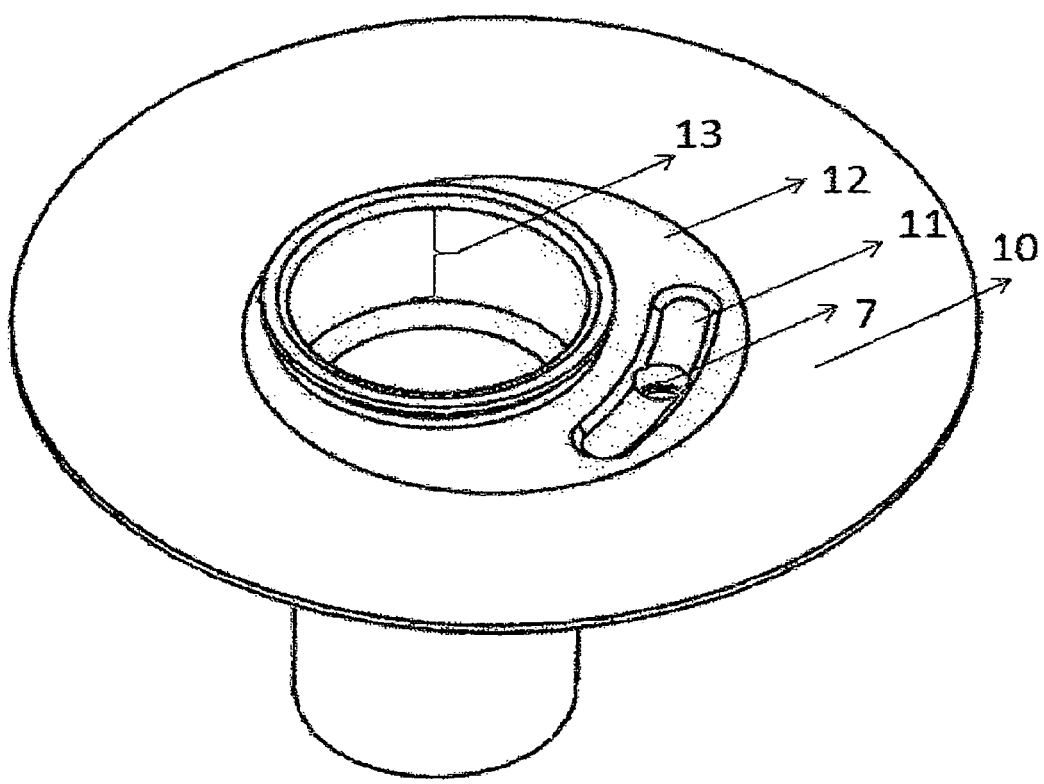
FIG. 25 displays 3D view without number 5, 9 and 8

It is suggested that holes "4" and "7" be the same size as pipe "8". The drain of the sanitary appliance can be inserted into side "2" of this invention, according to FIGS. 20 and 21. In these figures, "13" is designed so that the outlet of sanitary appliance can be inserted into this part and make a sealed join. But the Side "2" could also be in the size required to be inserted into the outlet of sanitary appliance and make a sealed joint with the drain of the sanitary appliance, and there is no difference between this two situations. This joint can be any type of permanent sealed connection suitable for the installation location and can be any kind of gasket seal or any other method.

Figure 10:
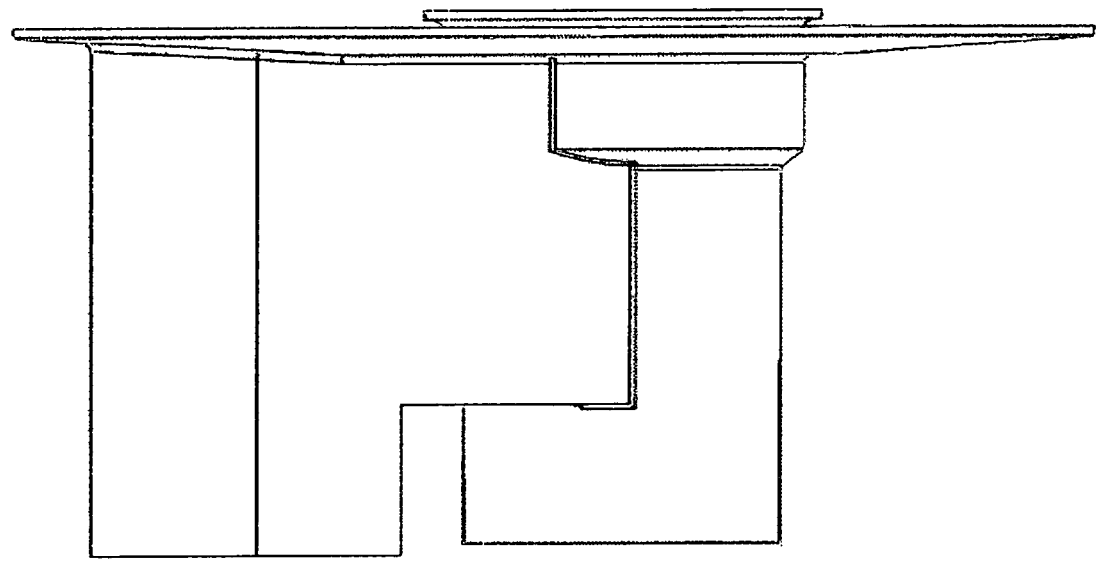
FIG. 10 displays a side view of the invention with all components (without number 15)
Figure 11:
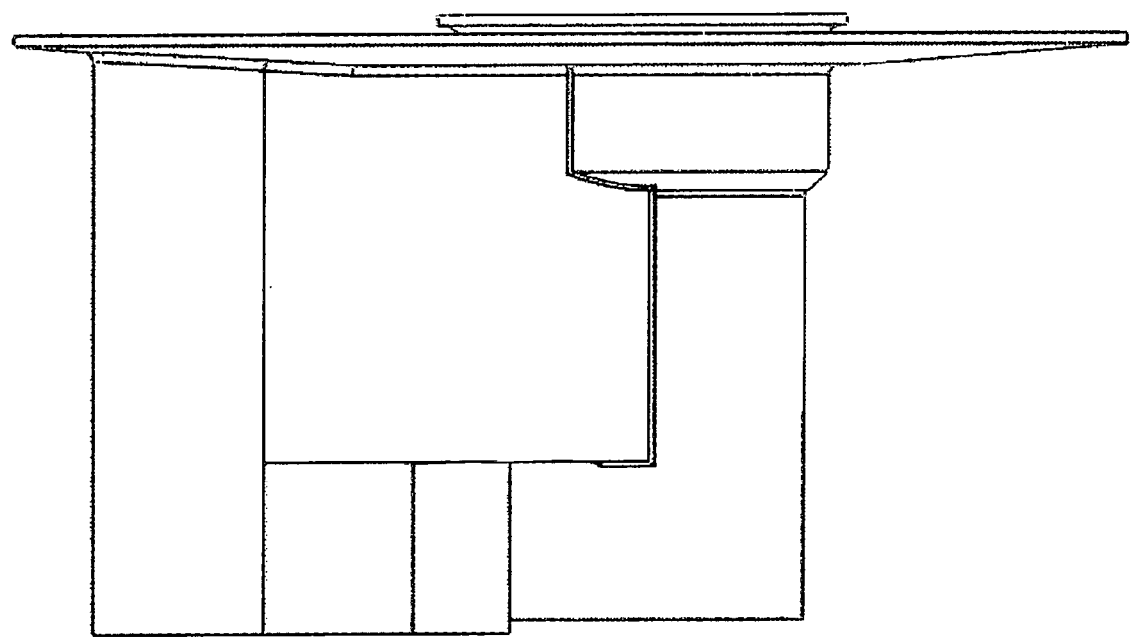
FIG. 11 displays a side view of the invention with all components (with number 15)
Figure 12:
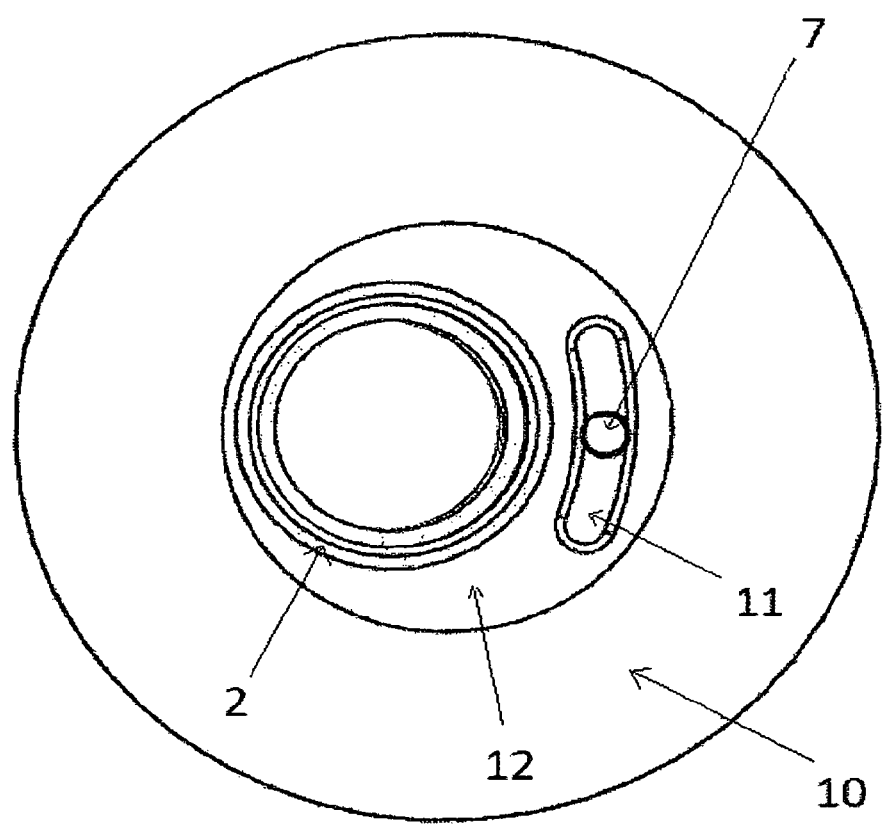
FIG. 12 displays a top view of the invention with all components
Figure 13:
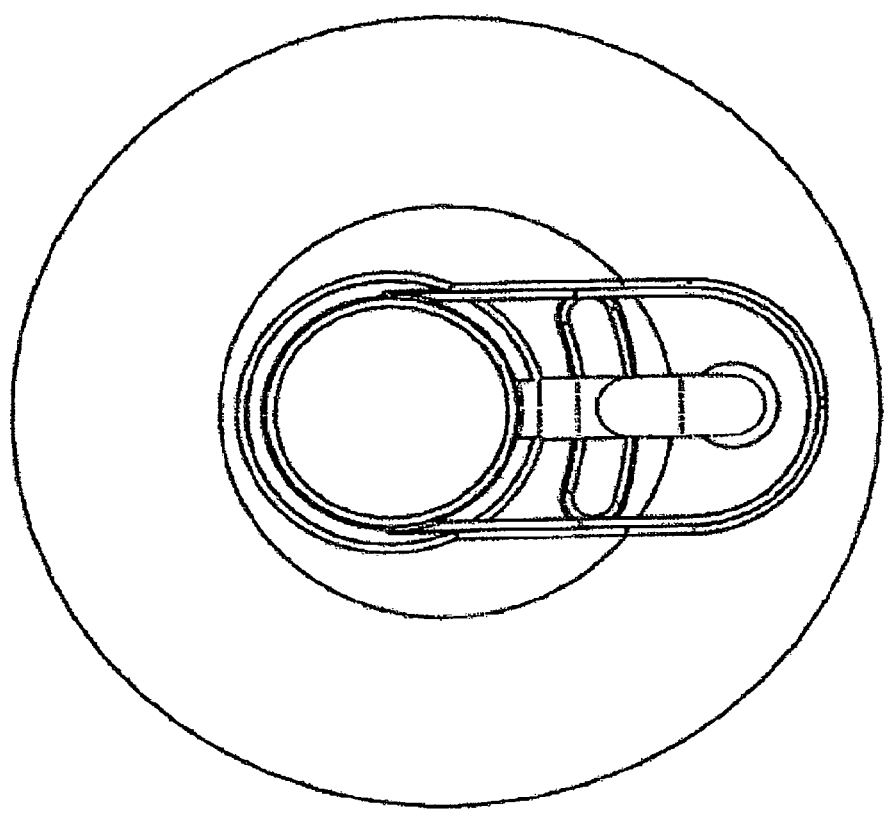
FIG. 13 displays a down view of the invention with all components (without number 15)
Figure 14:
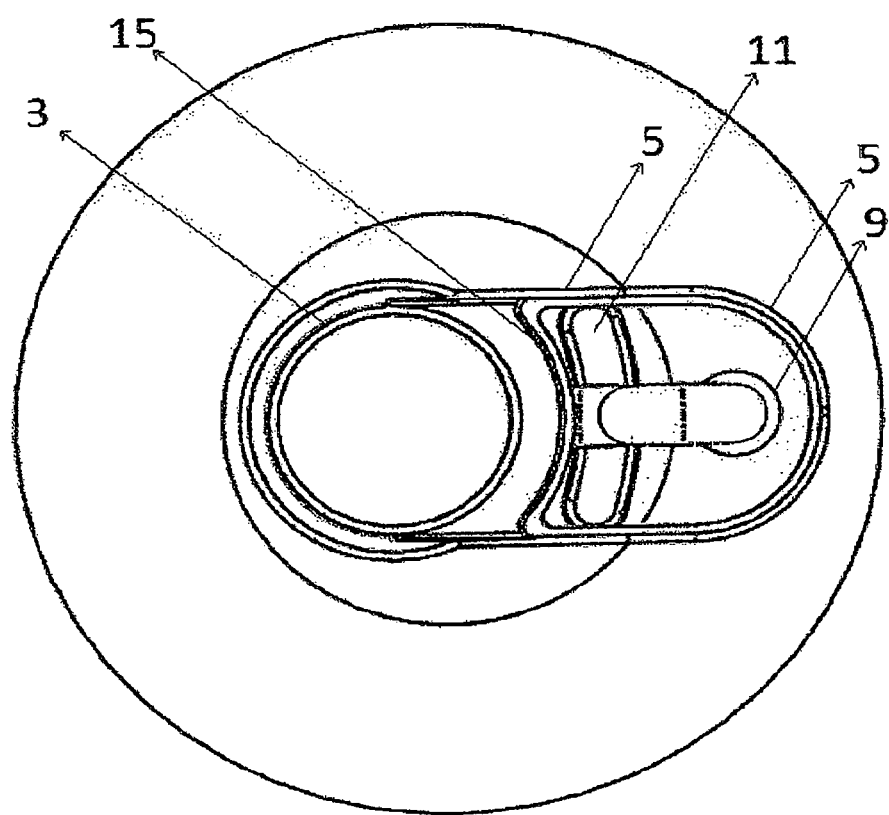
FIG. 14 displays a down view of the invention with all components (with number 15)
Figure 15:
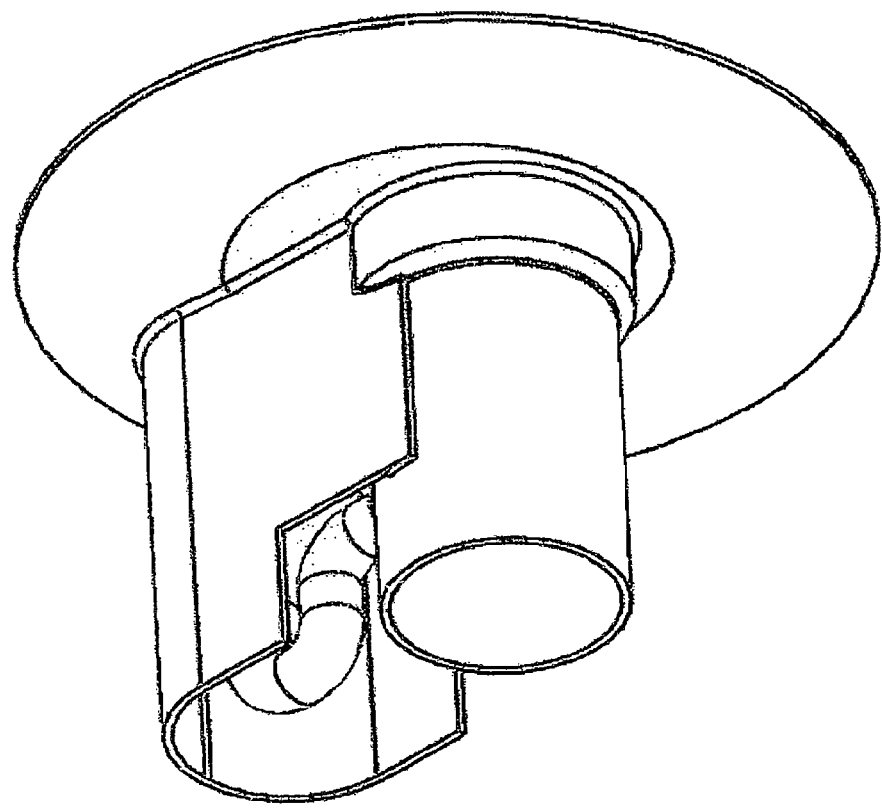
FIG. 15 displays 3D down view of the invention (without number 15)
Figure 16:
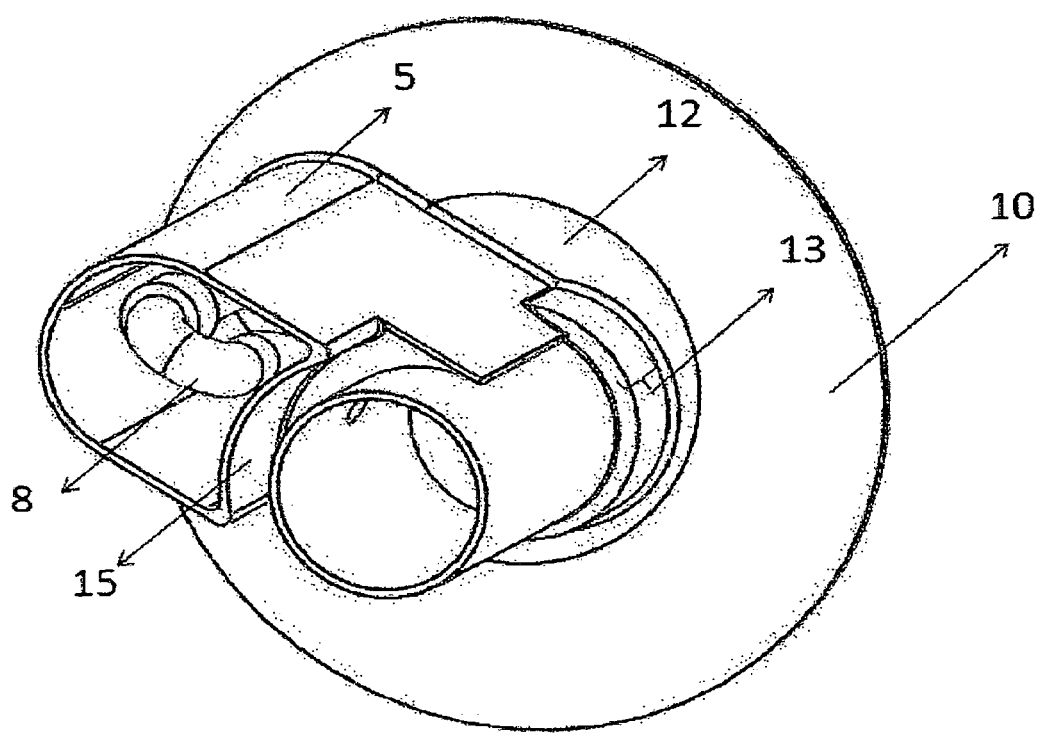
FIG. 16 displays 3D down view of the invention (with number 15)
Figure 17:
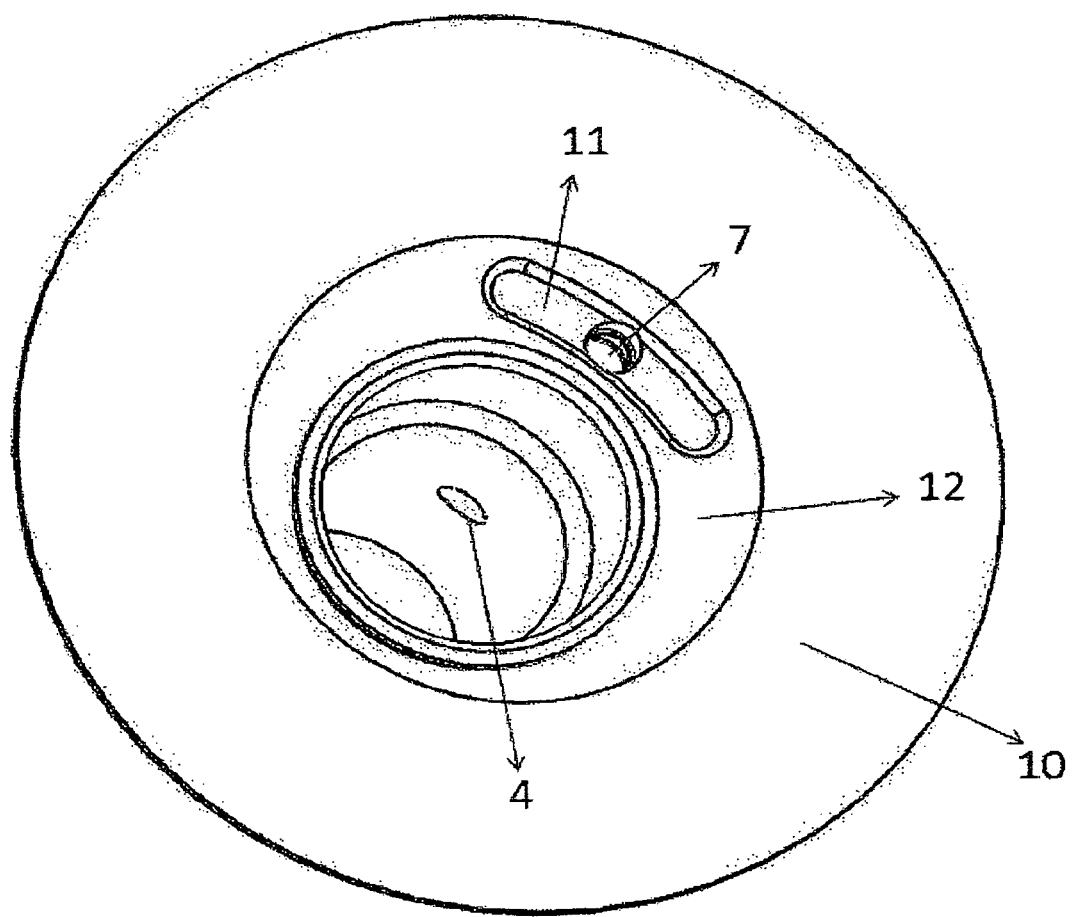
FIG. 17 displays 3D top view of the invention
Figure 18:
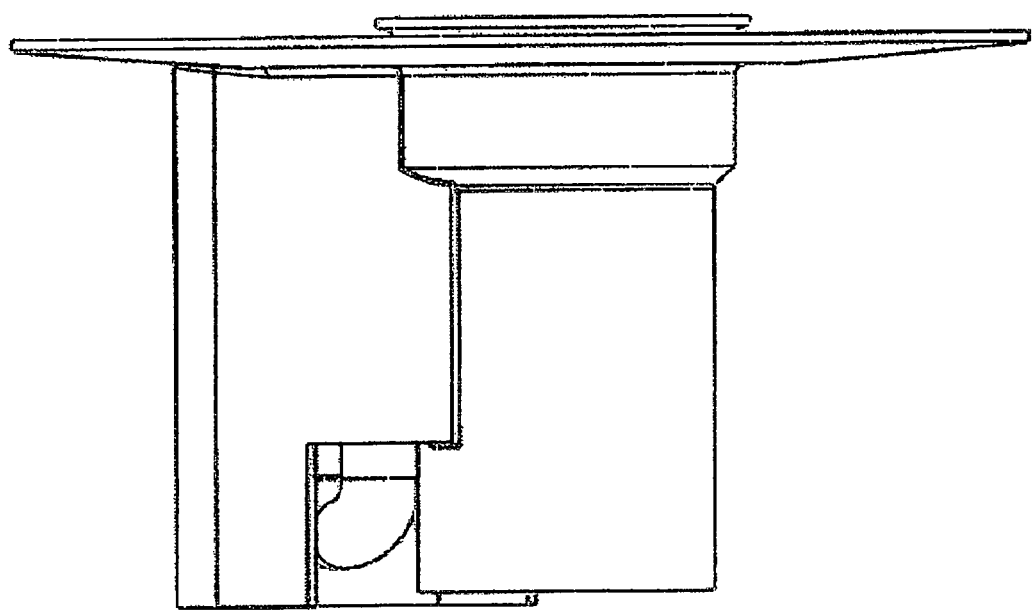
FIG. 18 displays a side view of the invention with clockwise rotation (without number 15)
Figure 19:
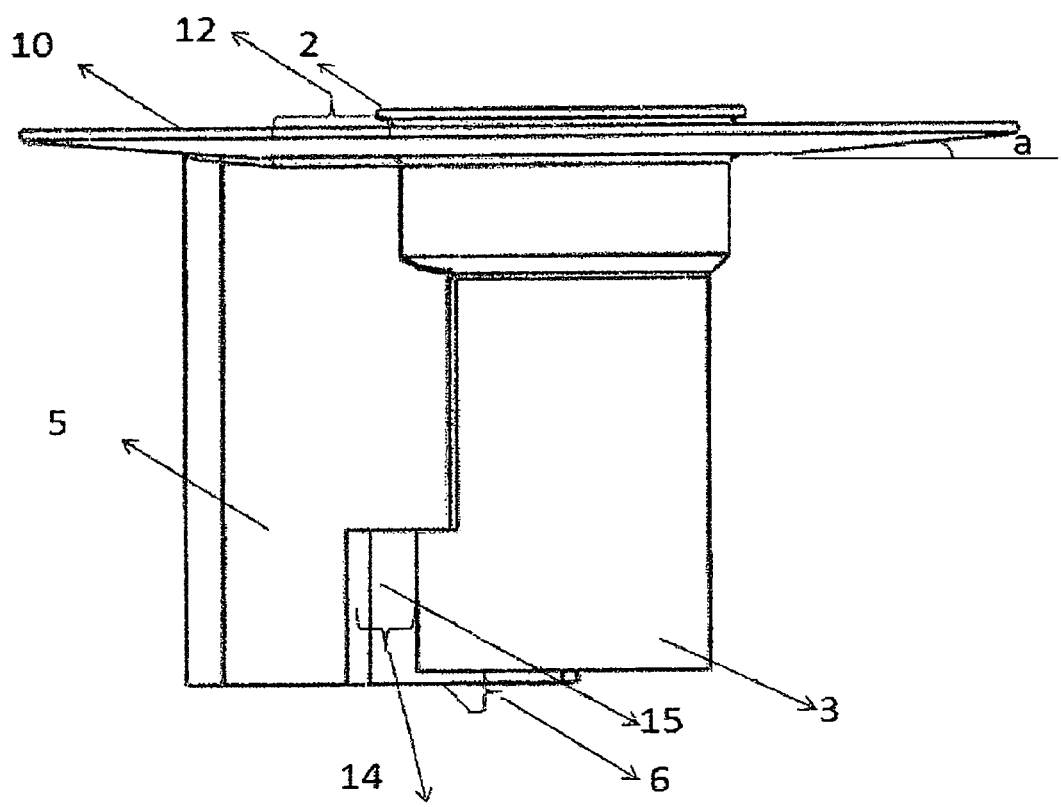
FIG. 19 displays a side view of the invention with clockwise rotation (with number 15)

The inlet of the sewer can be inserted into side "3" of this invention. Or also the side "3" outlet can be of the size such that it can be inserted into the inlet of sewer (according to FIGS. 10 and 11). The outlet of side "3" should be of a suitable size to make a sealed joint with the sewer outlet. In the figures of this invention, it is recommended that sewers of the sanitary appliances (or the sewers of any other wet places which discharge the water into the drain by the waterproof membrane) be placed in side "2" and in part "13".

And also that side "3" be located inside the building sewer "19". The gap "14" is embedded between "1" and "5" which allows the lower part of "1" from side "3" to be adequately inserted into the sewer system of the building. Part "6" is also continued into the below of the ceiling of the lower floor. "15" is designed to have access to parts "4", "9", "8", and "7" (according to FIGS. 11, 14, 16, 19, and 21), when the non-ground floors in a multi-story building are thick (in a way that this invention can be fully buried in the floor). In this case, the inner part of shield "5" is protected from damage by materials used in the construction of the building (e.g. cement, soil, sand, etc.) by "15". But if the floor is not sufficiently thick, in a way that there would not be contact between parts "4", "9", "8", and "7", and materials used in the construction of the building (e.g. cement, soil, sand, etc.), using "15" is optional (in the absence of this part, the invention is as shown in FIGS. 10, 13, 15, 18, and 20).

Installing this invention at the drain of the sanitary appliance (or any other wet place where water from the waterproof membrane "16" is discharged to the sewer) assures the supervising engineer that there will be no wastewater or sewage leaks in the future. In conventional methods that use silicon sealant or other primers, the engineer cannot be certain that the sealant was applied properly, and so cannot be certain about the leak prevention in the future. Even with a correct application of silicone sealant in the conventional method, a good quality sanitary silicone sealant containing mold inhibitors will last only 5 years after which it loses its elasticity and becomes detached from the surface, allowing water to seep under the waterproof membrane.

This invention solves all of these issues and is the final solution to leakage problems from sanitary appliances.

The invention claimed is:

1. An anti-leak system for sanitary appliances, comprising: A major conduit; wherein an inlet of said major conduit is connected and sealed on one end to any sanitary outlet and, on the other end is connected and sealed to a building's sewer; wherein said major conduit comprises a sloped and flat fringe connected and wrapped around said major inlet, having an angle with respect to the horizon; wherein said sloped fringe comprises a fringe hole; said system further comprising a minor conduit connected on one end to said fringe hole and is connected on another end via a minor outlet to said major conduit in a proximity to said major outlet; and wherein said minor conduit comprises a check valve nestled and installed approximately midway along a length of said minor conduit; said minor conduit is surrounded by a protecting shield and is connected.

2. The system of claim 1; wherein a waterproof membrane covers said sloped fringe entirely; and wherein said major conduit collects main wastewater; and all the rest of wastewaters leaked under a floor of said sanitary appliance enters said fringe hole and passes through said minor conduit and said check valve and exits through minor outlet into said major conduit, exiting with all of said main wastewater through said major outlet.

3. The system of claim 2, wherein said check valve prevents water from said major conduit from returning inside said sloped fringe where said waterproof membrane edges are located; therefore, preventing water to permeate under said waterproof membrane.

4. The system of claim 3, wherein said hole is located inside two semicircular indentations one having a larger diameter than the other, wherein a surface area around and top of a smaller one of said semicircular indentation is covered with a small wired mesh layer; and said larger semicircular indentation is covered with a larger mesh size relative to said small mesh; and finally covered with a plastic fiber.

5. The system of claim 4, wherein said plastic fiber comprises any material preventing cement, soil and sand for entering said hole.

6. The system of claim 5, wherein said major outlet is sealed by using a sealing gasket or any other suitable way to achieve permanent attachment.

7. The system of claim 6, wherein said angle is at least 5 degrees.

8. The system of claim 7, wherein said check valve is a duckbill valve, or an umbrella valve or any suitable valve capable of independent functioning despite their installation direction.

9. The system of claim 8, wherein said shield comprises a hollow and cylinder-shaped structure, connected on one end to said sloped fringe and on the other end enters said floor of said building where said sanitary appliance is installed; and wherein said structure merges along a structure length to said major conduit's outside wall; therefore wrapping around said minor conduit and protecting it from any damage.

10. The system of claim 9, wherein said system can be made of PVC, cast iron or any other long lasting material suitable for installing in a damp and moist environment around said sanitary appliance.

11. The system of claim 10, wherein said minor conduit is made of flexible material.

12. The system of claim 11, wherein said shield has a smaller radius near said major outlet in comparison to shield radius near said sloped fringe, therefore said shield creates a gap starting at where a conjoining wall of said shield with said major conduit ends, until said outside wall of said major conduit near said major outlet ends; therefore allowing for said major outlet to easily be installed and sealed with said building's sewer system.

* * * * *